United States Patent
Scott et al.

(10) Patent No.: US 9,199,278 B2
(45) Date of Patent: Dec. 1, 2015

(54) APPARATUS AND METHOD FOR SEPARATING SOLIDS FROM A SOLIDS LADEN DRILLING FLUID

(75) Inventors: Eric Scott, Conroe, TX (US); George Alexander Burnett, Aberdeen (GB); Khaled El Dorry, Houston, TX (US); Nahum Ronquillo, The Woodlands, TX (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 993 days.

(21) Appl. No.: 13/039,933

(22) Filed: Mar. 3, 2011

(65) Prior Publication Data

US 2011/0210083 A1    Sep. 1, 2011

Related U.S. Application Data

(60) Continuation-in-part of application No. 12/481,959, filed on Jun. 10, 2009, now Pat. No. 8,746,459, which is a division of application No. 11/977,727, filed on Oct. 25, 2007, now abandoned, which is a division of application No. 11/096,192, filed on Mar. 31, 2005, now abandoned, which is a continuation-in-part of application No. 10/949,882, filed on Sep. 25, 2004, now Pat. No. 7,278,540, and a continuation-in-part of application No. 10/835,256, filed on Apr. 29, 2004, now Pat. No. 7,331,469, and a continuation-in-part of application No. 10/512,372, filed on Oct. 25, 2004, now Pat. No. 7,581,647, which is a continuation-in-part of application No. 10/373,216, filed on Feb. 24, 2003, now Pat. No. 6,907,375.

(60) Provisional application No. 60/424,262, filed on Nov. 6, 2002, provisional application No. 61/311,493, filed on Mar. 8, 2010.

(51) Int. Cl.
| | |
|---|---|
| *B07B 1/42* | (2006.01) |
| *B01D 33/03* | (2006.01) |
| *B07B 1/28* | (2006.01) |
| *B07B 1/46* | (2006.01) |
| *B07B 13/18* | (2006.01) |

(52) U.S. Cl.
CPC .............. *B07B 1/42* (2013.01); *B01D 33/0315* (2013.01); *B01D 33/0376* (2013.01); *B07B 1/28* (2013.01); *B07B 1/46* (2013.01); *B07B 13/18* (2013.01); *B07B 2230/01* (2013.01)

(58) Field of Classification Search
CPC .............. B07B 1/28; B07B 1/42; B07B 1/46; B07B 13/18; B07B 2230/01; B01D 33/0315; B01D 33/0376
USPC .............. 209/319, 365.4, 404, 405, 412, 413; 210/144, 785
See application file for complete search history.

(56) References Cited

U.S. PATENT DOCUMENTS

| | | | | |
|---|---|---|---|---|
| 4,809,791 | A * | 3/1989 | Hayatdavoudi | ................. 175/40 |
| 5,791,494 | A * | 8/1998 | Meyer | ........................... 209/368 |
| 2006/0243643 | A1* | 11/2006 | Scott et al. | ................... 209/309 |
| 2008/0128334 | A1 | 6/2008 | Scott et al. | |

FOREIGN PATENT DOCUMENTS

| | | |
|---|---|---|
| DE | 40 30 665 C1 | 10/1991 |
| WO | 2007/014444 A1 | 2/2007 |

OTHER PUBLICATIONS

International Search Report and Written Opinion from PCT/GB2011/050419 dated Jun. 20, 2012.

* cited by examiner

*Primary Examiner* — Joseph C Rodriguez
*Assistant Examiner* — Kalyanavenkateshware Kumar
(74) *Attorney, Agent, or Firm* — Amerson Law Firm, PLLC

(57) ABSTRACT

A method for operating a shale shaker to separate solids from a solids laden fluid, the shale shaker comprising a basket for holding at least one screen and a vibratory mechanism for vibrating the basket to an acceleration value, the method comprising the steps of monitoring the magnitude of the load of solids laden fluid in the basket and adjusting the acceleration value induced in the basket according to the magnitude of the load, wherein the acceleration is stepped down to a low acceleration value below a low load threshold.

27 Claims, 6 Drawing Sheets

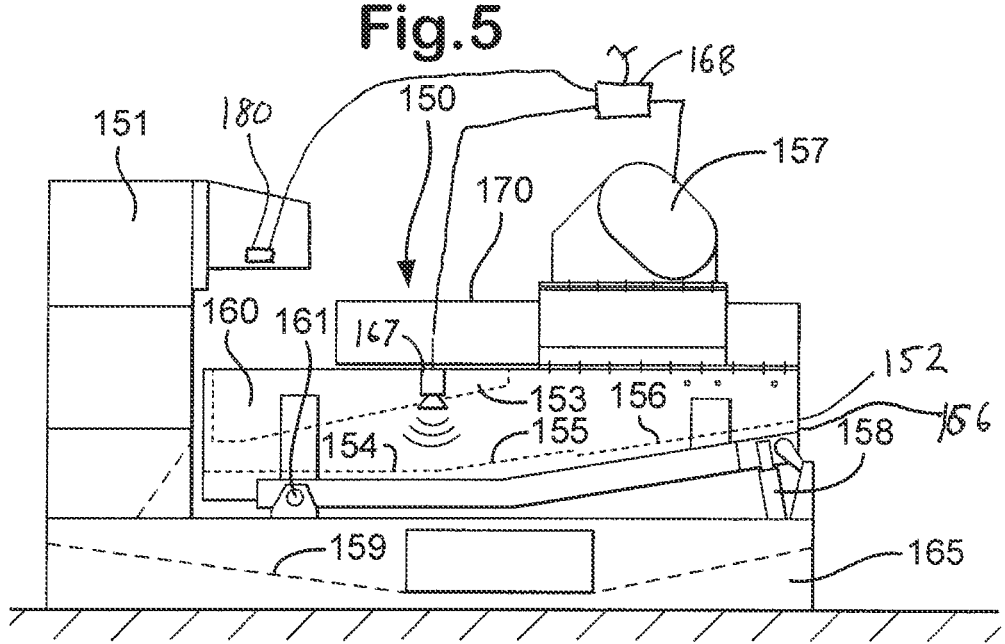

APPARATUS AND METHOD FOR SEPARATING SOLIDS FROM A SOLIDS LADEN DRILLING FLUID

CROSS-REFERENCE TO RELATED APPLICATIONS

This case claims priority from U.S. Provisional Application No. 61/311,493, filed Mar. 8, 2010, and is: a continuation-in-part of U.S. application Ser. No. 12/481,959, filed Jun. 10, 2009, which is a divisional of Ser. No. 11/977,727, filed Oct. 25, 2007, now abandoned, which is a divisional of Ser. No. 11/096,192, filed Mar. 31, 2005, now abandoned, which is a continuation-in-part of U.S. application Ser. No. 10/949,882, filed Sep. 25, 2004, now U.S. Pat. No. 7,278,540; a continuation-in-part of U.S. application Ser. No. 10/835,256, filed Apr. 29, 2004, now U.S. Pat. No. 7,331,469; a continuation-in-part of U.S. Ser. No. 10/512,372, filed Oct. 25, 2004, now U.S. Pat. No. 7,581,647, is a 371 of Application Ser. No. PCT/IB03/01031, filed Mar. 12, 2003, which claims priority from U.S. Ser. No. 10/134,027, filed Apr. 26, 2002; and a continuation-in-part of U.S. Ser. No. 10/373,216, filed Feb. 24, 2003, now U.S. Pat. No. 6,907,375, which claims priority from U.S. Application Ser. No. 60/424,262, filed Nov. 6, 2002—all of which are incorporated fully herein and with respect to all of which the present invention claims priority under the Patent Laws.

BACKGROUND

1. Field of the Disclosure

The invention relates to an apparatus and method for separating solids from a solids laden drilling fluid and, more particularly, but not exclusively, a vibratory separator commonly known as a shale shaker for separating solids from a solids laden drilling mud.

2. Description of the Related Art

In the drilling of a borehole in the construction of an oil or gas well, a drill bit is arranged on the end of a drill string, which is rotated to bore the borehole through a formation. A drilling fluid known as "drilling mud" is pumped through the drill string to the drill bit to lubricate the drill bit. The drilling mud is also used to carry drill cuttings produced by the drill bit and other solids to the surface through an annulus formed between the drill string and the borehole. The density of the drilling mud is closely controlled to inhibit the borehole from collapse and to ensure that drilling is carried out optimally. The density of the drilling mud affects the rate of penetration of the drill bit. By adjusting the density of the drilling mud, the rate of penetration changes at the possible detriment of collapsing the borehole. The drilling mud may also carry lost circulation materials for sealing porous sections of the borehole. The acidity of the drilling mud may also be adjusted according to the type of formation strata being drilled through. The drilling mud contains inter alia expensive synthetic oil-based lubricants and it is normal therefore to recover and re-use the used drilling mud, but this requires inter alia certain solids to be removed from the drilling mud. This is achieved by processing the drilling mud. The first part of the process is to separate drill cuttings from the solids laden drilling mud. This is at least partly achieved with a vibratory separator, such as those shale shakers disclosed in U.S. Pat. No. 5,265,730, WO 96/33792 and WO 98/16328. Further processing equipment such as centrifuges and hydrocyclones may be used in the processing of the used drilling mud. The solids are covered in contaminates and residues. It is not uncommon to have 30 to 100 $m^3$ of drilling fluid in circulation in a borehole.

The resultant solids, known herein as "drill cuttings" are processed to remove substantially all of the residues and contaminates from the solids. The solids can then be disposed of in a landfill site or by dumping at sea in the environment from which the solids came. Alternatively, the solids may be used as a material in the construction industry or have other industrial uses.

Shale shakers generally comprise an open bottomed basket having one open discharge end and a solid walled feed end. A number of rectangular screens are arranged over the open bottom of the basket. The screens may be substantially planar or have a slight crown. The basket is arranged on springs above a receptor for receiving recovered drilling mud. A skip or ditch is provided beneath the open discharge end of the basket. A motor is fixed to the basket, which has a drive rotor provided with an offset clump weight. In use, the motor rotates the rotor and the offset clump weight, which causes the basket and the screens fixed thereto to shake. Solids laden mud is introduced at the feed end of the basket on to the screens. The shaking motion induces separation of the drilling mud from the solids, the drilling mud passing through the screens and the solids above the screens. The shaking motion also induces the solids to move along the screens towards the open discharge end. The recovered drilling mud is received in the receptor for return to the active mud system of the drilling rig or on for further processing and the solids pass over the discharge end of the basket into the ditch or skip.

The recovered drilling mud may contain smaller particles such as additives that are required for maintaining desired drilling fluid density and viscosity, which may be desirable and thus these smaller particles are left in the recovered drilling mud.

The rectangular screens may be arranged at an angle to horizontal, such as a seven degrees incline from the feed end to the discharge end of the shale shaker. The angle may be adjustable. The screens are generally fixed in the basket and the basket is adjustable to adjust the angle of the screens relative to horizontal. The flow of solids laden drilling fluid may form a pool on the inclined screens. The action of the vibratory mechanism induces solids to climb the inclined screens to the discharge end of the shaker and into the ditch or skip.

Generally, a vibratory mechanism inducing a circular vibration will tend to throw solids from the screen into the air in generally circular motions sufficient to move the overflow of solids along a generally horizontal screen deck.

A vibratory mechanism inducing an elliptical motion will induce the solids to move in a direction of the longest chord of the ellipse, which is often used in shale shakers having an inclined screen deck, such that the solids move up the inclined screen deck. A shale shaker having a vibratory mechanism inducing a very thin ellipse is known as a linear shale shaker and induces fast movement of solids along the screen, although the screen tends to suffer fast degradation due to sudden deceleration of the solids as they meet the screen. The screen decks are inclined so that a pool of drilling mud to be screened is allowed to form thereon, which creates a head of fluid above the screen. This head helps push drilling mud and small solids through the screen. The elliptical or linear motion helps solids move along the screen within the pool, on to and traverses a dry portion of the screen, known as a beach. The solids move along the beach over a discharge end of the screen into a cuttings ditch, trough, pipe or other conveying means.

The pool of fluid on the screen deck adds to the weight need to be vibrated. Furthermore, too large a head of drilling mud above the screen may increase the likelihood of blinding the screen, which may well occur when screening drilling mud with heavy clays therein. In particular, the heavy clays may break down on the screen and be pushed into openings in the screen mesh. Thus the pool size and depth can affect efficient operation of the separator or shaker. A pool that is too deep may not be adequately filtered. A pool that is too shallow may flow across a screen too quickly or without sufficient weight to be filtered adequately. It is generally beneficial to have a pool of drilling mud on the screen, but one having a controlled depth.

One factor in screen life is how well the beach area is maintained. "Beach" area is the distance from a fluid-dry interface-with-fluid line on a final screen to the end of the screen. Thus, a zero beach length describes a shaker operating with drilling fluid covering the entire screen area of the final screen and running over to discharge. This can be costly due to the loss of drilling fluid which flows off, rather than through, a screen. A beach length of 50 cm (20 inches) in certain shakers indicates a shaker operating fairly dry, with the last sections of screen potentially vibrating against completely dry particles. Such dry particles vibrating on the beach of the last screen can tear holes in the screen and shorten the screen life. The beach length is affected by variables such as fluid flow rates and drilling fluid properties including viscosity, density, temperature, and solids content.

The screens used in a shale shaker experience high acceleration values, heavy loading, high throughput and variable beach lengths when processing drilling fluids. The high acceleration values are required in order to induce throughput through the screens and in order to convey the solids over the screen for discharge.

The shale shaker vibratory drive apparatus is sized in order to induce an optimal stroke profile based upon the total mass of assembly including the vibratory drive apparatus, basket, screens and solids laden drilling fluid therein i.e. all of the vibrated components, essentially the sprung mass. The screens are clamped or otherwise fastened to the basket and the screens support the solids laden drilling fluid to be processed.

WO 2005/105327, incorporated herein for all purposes, discloses a vibratory separator for screening solids laden drilling mud, the vibratory separator comprising at least one screen arranged in a basket isolated from a base, vibratory apparatus for vibrating the at least one screen and means for adjusting the angle of the at least one screen, such that, in use solids laden drilling mud forms a pool on the at least one screen, the pool having a surface, the surface having a trailing edge defining a beach characterized in that the vibratory apparatus comprises a variable frequency drive (or inverter) and control apparatus to control the variable frequency drive for driving the screen in at least one motion profile. Preferably, the control apparatus comprises a PLC or a computer. If a desired acceleration value is changed according to the states of the shaker and mud, then performance is further enhanced and/or optimized. For instance, the acceleration level is adjusted to minimize energy consumption, or to use the minimum necessary acceleration based on the fluid level in the shaker. This is useful since high acceleration can lead to decreased screen life and solids degradation.

WO 2005/105327 also discloses an automatic boost feature. In this case, the shaker acceleration is temporarily increased to a predetermined value, e.g. in order to accommodate unusually high mud flow. More generally, when the shaker acceleration is controlled, then it can be varied over a continuous range [e.g. for such control a monitoring device monitors an accelerometer on or connected to a shaker basket and the monitoring device (e.g. a computer, PLC, or PID controller) sends a signal to a VFD). For instance, the acceleration can be controlled to be constant under varying mud flow/loading. This is accomplished by measuring the basket acceleration with an accelerometer located on the basket, in one aspect near the center of mass, e.g. accelerometer AC in FIG. 11C; feeding back the signal from the accelerometer to a shaker computer (or PID controller, or to a remote computer); comparing the actual acceleration with the desired value; and changing the motor frequency or other driving force until the actual acceleration matches the desired acceleration.

WO 2007/045924 discloses a shale shaker comprising an electromagnetic vibratory apparatus having a driving apparatus comprising a variable frequency drive to maintain the basket at a natural resonant frequency.

WO 2007/057712 discloses a shale shaker comprising an electromagnetic vibratory apparatus, which preferably is arranged between a floating basket and a fixed base and advantageously comprises a leaf spring.

The motion induced into the assembly is typically a simple harmonic motion, whereby starting from its lowest point the vibratory drive, basket, screens and solids laden drilling fluids is accelerated upwards typically in an elliptical motion, the longest chord of the ellipse set at around forty-five degrees towards the front of the basket by high positive acceleration forces reducing towards mid stroke where the acceleration values reduce to zero then negative deceleration occurs reducing the velocity to a minimum at the top of the stroke. This cycle is repeated on the downward stroke showing that high acceleration values, (positive and negative) are experienced at each tip of the stroke where the velocity is minimized and the acceleration values are zero at each mid-point of the stroke where the velocities are at their highest.

As the fluids are not physically attached to the screens the screen loading varies therefore dependent upon the stroke cycle. During the upward stroke the screen is accelerated into the fluid mass thereby inducing throughput then the screen accelerates away from the fluid mass on the downward stroke only for the fluid mass to drop onto the screens again at the bottom of the stroke due to gravity and the whole cycle is then repeated typically at approximately 1800 to 2000 rpm.

For optimal performance the screen overall should preferably move as one entity matching the stroke profile of the basket and any deflection should be minimized. Should the screen deflect then this can lead to far higher acceleration values being induced leading to premature wear and uneven loading across the width of the screen. Given that the motion is also utilized to convey solids across the screen, any additional deflection of the screen will result in uneven conveyance across the screen width.

It is known to have a further screen deck in the shale shaker, having screens thereon of around 40 to 60 mesh to scalp off large solids. The underflow is then directed back on to a lower, feed end of a primary screen deck. This feature can be found on the VSM 300® Shale Shaker supplied by the Brandt division of National Oilwell Varco. It is also known to have a drying deck, such that the solids overflow from the discharge end of the primary deck on to drying deck to facilitate drying of the solids. This feature can be found on the VSM 300® Shale Shaker and King Cobra® Shale Shaker supplied by the Brandt division of National Oilwell Varco.

It is advantageous to use fine-meshed filters to filter very small particles, for example of a size in the range of 50-200μ or more, without the filtering device clogging up with the small particles. However, it is the fine-meshed filters in particular that are prone to such undesired clogging.

It is also advantageous to provide a separator which operates at low noise levels to comply with health and safety legislation. It is also advantageous to have a simple reliable separator to inhibit down-time for maintenance and repair.

It is preferable in certain circumstances to retain particles, for example of a particle size in the range of 50-60μ or larger, by means of a filter.

Apparatus has been modified to separate out Lost Circulation Material for re-use. Such apparatus comprises a scalping deck to screen out large drill cuttings, the underflow of which flows on to a primary deck provided with mesh sized and designed to screen out Lost Circulation Material. The Lost Circulation Material is returned to the active mud system of the drilling rig and the underflow from the primary screen flows through a secondary screen deck to filter out drill cuttings. The filtered drill cuttings are walked into a trough or cuttings ditch. The underflow of drilling fluid containing very small particles is returned to the active mud system. Such a system is the SWECO Multi-Deck Mud Cleaner, tub type shale shaker supplied by SWECO Oilfield Services.

In the drilling of an oil or gas well, cracks may exist in the wall of the wellbore. Such cracks may propagate, which could cause structural problems in the wall of the wellbore and/or allow drilling fluids to escape therethrough into the formation. Furthermore, if substantial amounts of drilling fluids are lost, the pressure in the drilling fluid in the wellbore may drop, which could cause collapse of the wellbore. Accordingly, a type of Lost Circulation Material known as Wellbore Strengthening Materials may be added to circulated drilling fluid. The Wellbore Strengthening Materials comprise sized particles. When the drilling fluid is circulated around the wellbore wall with cracks therein, the sized particles wedge themselves in the cracks, which reduces the likelihood of the cracks propagating. It is beneficial to recover these sized particles and reuse them in circulated drilling mud. Shale shakers have thus been modified to size solids in solids laden drilling fluid. Such a shale shaker is disclosed in U.S. Ser. No. 12/490,492. A range of sizes of solids can be extracted using such a shale shaker and re-circulated as Wellbore Strengthening Material in fresh drilling fluid.

In many conventional separators and shakers tilting or raising mechanisms are provided to adjust the angle of screen(s) with respect to the horizontal. U.S. Pat. No. 4,082,657 describes a separator apparatus which has individual height adjustable mounting structures for each screen unit which permit adjustment of the screen unit angle with respect to the horizontal. U.S. Pat. No. 6,575,304 describes a hydraulic ram apparatus beneath a screen body which is used to adjust the angle of incline of the screen body.

In many conventional systems, a determination of the level of material or fluid on a screen or screen assembly of a separator or shaker is done visually and then adjustments of screen incline angle or of screen support incline angle are done manually. A need remains for improved shaker designs, and improved control systems for shakers.

Known shale shakers generally run at a constant speed and thus as drilling mud is introduced on to the screens in the basket the acceleration value drops off.

The present disclosure is directed to various methods and devices that may avoid, or at least reduce, the effects of one or more of the problems identified above.

SUMMARY OF THE DISCLOSURE

The following presents a simplified summary of the present disclosure in order to provide a basic understanding of some aspects disclosed herein. This summary is not an exhaustive overview of the disclosure, nor is it intended to identify key or critical elements of the subject matter disclosed here. Its sole purpose is to present some concepts in a simplified form as a prelude to the more detailed description that is discussed later.

According to the present disclosure, there is provided an illustrative method for running a shale shaker, the shale shaker comprising a basket having a least one screen. In one illustrative embodiment, the method comprises the steps of using a control apparatus to monitor the magnitude of the load of solids laden fluid in the basket and the control apparatus and adjusting the acceleration value induced in the basket according to the magnitude of the load, wherein the acceleration is stepped down to a low acceleration value below a low load threshold.

At a low load, there may be very little fluid in the shaker, but a quantity of solids on the screens. These solids may be hard rock particles. Vibrating hard rock particles on a dry screen can wear the screens out very quickly. Reducing acceleration induced in the screens dramatically reduces wear. Furthermore, bearing life and fatigue on parts of the shale shaker is dramatically reduced.

In another example, the method further comprises the steps of using the control apparatus to monitor the magnitude of the load of solids laden fluid in the basket and adjusting the acceleration value induced in the basket according to the magnitude of the load, wherein the acceleration is stepped up to a higher acceleration value above a medium load threshold. In this example, the low load threshold may off-set the medium load threshold to inhibit chatter which may occur when load stays close to the low load threshold.

The method may further comprise monitoring the magnitude of the load of solids laden fluid in the basket and adjusting the acceleration value induced in the basket such that the acceleration is stepped up to a high acceleration value at a high load threshold.

The method may also comprise the step of monitoring the magnitude of the load of solids laden fluid in the basket and adjusting the acceleration value induced in the basket so as to maintain the low acceleration value at varying loads below said low load threshold, thus providing a smooth ramp up or ramp down acceleration.

The method may also comprise the step of monitoring the magnitude of the load of solids laden fluid in the basket and adjusting the acceleration value induced in the basket to maintain the higher acceleration value at varying loads above the medium load threshold, thus providing a smooth ramp up or ramp down acceleration.

As another example, the method may further comprise monitoring the magnitude of the load of solids laden fluid in the basket and adjusting the acceleration value induced in the basket so as to maintain the high acceleration value at varying loads above the high load threshold, thus providing a smooth ramp up or ramp down acceleration.

In one illustrative embodiment, the control apparatus described herein may comprise an accelerometer and the method may include the step of measuring the acceleration of the basket, wherein the accelerometer produces a signal indicative of basket acceleration. As acceleration of the basket is known to decrease with an increase in load, the load can be estimated from the decrease in acceleration. Thus, the signal indicative of basket acceleration is related to the magnitude of the load in the basket. The system may comprise two or more accelerometers, and, in that case, the average of two readings taken may be used to assess basket acceleration.

In one embodiment, the accelerometer may measure peak to peak acceleration and generate a signal indicative of basket acceleration relative thereto. The method may also comprise the step of measuring acceleration in a plane. As noted, the signal indicative of basket acceleration may be the peak to peak acceleration in the plane.

In one illustrative embodiment, the step of adjusting the acceleration value induced in the basket may be carried out using a programmable inverter, wherein the vibratory mechanism comprises an AC drive motor. Additionally, in some cases, the control apparatus may be a computer for analyzing the magnitude of the load.

In one illustrative embodiment, the low load threshold may be between 40 Kg and 150 Kg; the medium load threshold may be between 40 Kg and 150 Kg; and the high load threshold may be between 150 Kg and 300 Kg.

In one particular example, the step in acceleration is at least 5 m/s² (0.5 g).

The control apparatus may include a distance measuring apparatus and the method may include the step of using the distance measuring apparatus, such as an illustrative ultrasonic transducer, to assess a depth of a pool of solids laden fluid in the basket, wherein the control apparatus produces a signal indicative of depth of the pool. The control apparatus may include a computer or other programmable device. In one illustrative embodiment, a mass of solids laden fluid in the basket is estimated from the depth of pool measurement, the angle at which the screens are arranged and an estimated or predetermined density for the solids laden drilling fluid. A signal indicative of the mass is then used as the input on a programmable inverter, programmed as described herein with respect to use of the accelerometer.

In one illustrative embodiment, the solids laden fluid is a solids laden drilling mud.

The present disclosure also provides one illustrative embodiment of a control system for a shale shaker, the control system comprising at least one accelerometer for measuring basket acceleration, wherein the accelerometer produces a basket acceleration signal. The system may also include a programmable inverter for receiving the basket acceleration signal and controlling the speed of an AC motor of a vibratory mechanism in response to the basket acceleration signal, wherein the programmable inverter may be programmed with a set of rules to step down the speed of the AC motor at a low load threshold.

In another illustrative embodiment, the present disclosure also provides a control system for a shale shaker, wherein the control system includes at least one accelerometer for measuring basket acceleration. In this embodiment, the accelerometer may produce a basket acceleration signal. The system may also include a computer for receiving the basket acceleration signal and controlling the speed of a vibratory mechanism in response to the basket acceleration signal. The computer may be programmed with a set of rules to step down the speed of the AC motor at a low load threshold.

The use of eccentric clump weights to induce vibration into a shale shaker has been ongoing for many years. Aspects of the present disclosure may be implemented with systems and apparatus as described in U.S. Pat. No. 7,571,817, incorporated herein in its entirety. It is understood that the basket displacement peak to peak value is a function of the mass of the basket and the masses of the clump weights along with the distance from the shaft axis to the offset center of gravity of the clump weights, such that the ratios: basket peak to peak displacement divided by two times the clump weight offset value equals the mass of the clump weights divided by overall mass of the basket.

This relationship holds true at all speeds and it can therefore be seen that by adding a charge to the basket, thereby increasing its mass results in a reduction in peak to peak displacement. When using fixed clump weights, the acceleration of the basket is, therefore, a function of the baskets running speed, a typical Shale Shaker will run in a range from 1800-2100 rpm, although it can also run as low as 1500 and as high as 3000 rpm. Aspects of the disclosure are not limited to a specific running speed.

The performance of a Shale Shaker is influenced by its running speed, the higher the running speed the higher the acceleration, giving higher throughput values and faster solids conveyance. However, running at higher acceleration values can cause premature wear and tear to the basket itself due to higher stresses, reduced bearing life and reduced screen life.

By utilizing feedback from an accelerometer, it is possible to quantify an approximate load charge within the shale shaker as the acceleration values are known for the shale shaker at all running speeds while empty and are known to reduce as additional mass is added to the basket. It is then possible to ensure that the running speed is reduced when not required, i.e., under low or no load conditions, by utilizing an inverter. Programmable inverters are available that can vary their output speed based on logic.

In a process according to the present disclosure, on startup, the basket ramps up to an initial running speed, which will then "pull" several Gs (e.g., approximately 63 m/s² (6.5 g) at a nominal speed of 1800 rpm) acceleration while the basket is empty. A G value is then used as a setpoint for the inverter which should be equal to or above the "empty" basket value. As the basket is loaded with its charge, the reduced displacement results in a reduction in acceleration, which is then recouped by the inverter increasing its running speed. Therefore, by monitoring the running speed, an indication is given of its loading condition.

In one aspect of the disclosure, a single setpoint is used and the basket is free to vary its speed in order to maintain the acceleration value, thereby automatically reducing the wear and tear as described above, there is no need to run higher acceleration values when the basket is lightly loaded or not loaded at all.

Alternatively, in other aspects, two or more setpoints may be utilized to set operating speeds for given loading conditions, or operating speeds may be defined for given loading conditions. These settings can be tuned in order to give a smooth ramp up to maximum speeds when required and to ensure safe ramp down to reduced running speeds when not required.

In some aspects of the disclosure, this function can be selected by the operator such that it is utilized under heavy loading conditions and normal running speed is only utilized under lighter loading conditions.

BRIEF DESCRIPTION OF THE DRAWINGS

The disclosure may be understood by reference to the following description taken in conjunction with the accompanying drawings, in which like reference numerals identify like elements, and in which:

FIG. 5 shows a shale shaker in accordance with the present disclosure.

Figure 1:
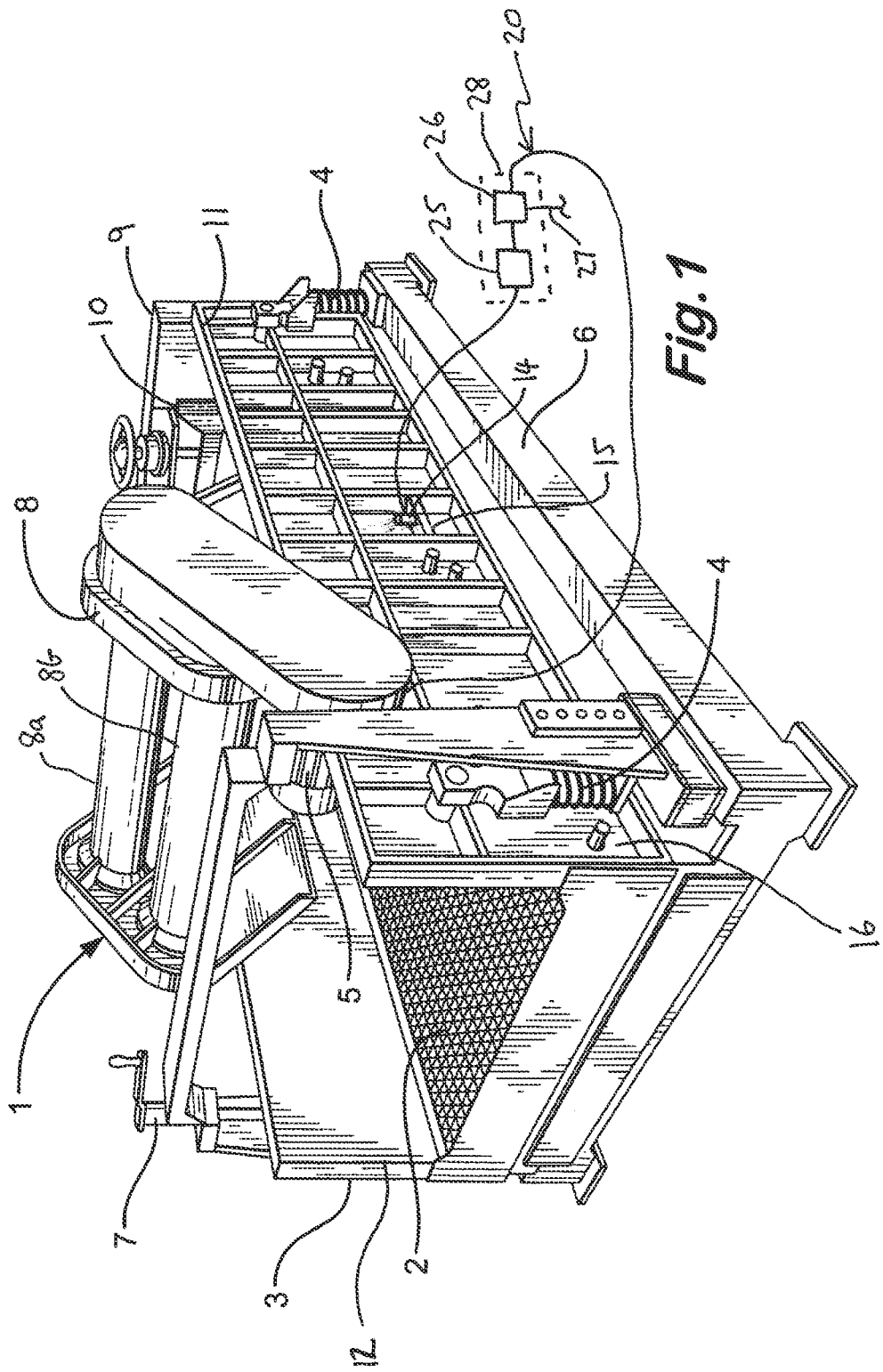
FIG. 1 is a perspective view of a shale shaker in accordance with the present disclosure comprising a control system shown diagrammatically in accordance with the present disclosure.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring to FIG. 1, an illustrative shale shaker 1 is shown with at least one screen assembly 2 mounted therein. The screen assembly comprises a frame (not shown) and a layer of screening material tensioned over the frame. The at least one screen assembly 2 is mounted in a basket 3, which has an open bottom, for allowing drilling mud and small particles to pass into a receptacle (not shown) therebeneath. Solids laden drilling mud is introduced from a tank 9 to a feed end 11 of basket 3. The tank 9 is fixed to a structural base 6 and has a weir 10 over which solids laden drilling fluid passes on to the at least one screen assembly 2. Oversized solids pass over the at least one screen assembly 2 through a discharge end 12 into a skip or ditch (not shown). The basket 3 is mounted on springs 4 (only two shown; two as shown are on the opposite side) which are supported on a structural base 6. The basket 3 and the at least one screen assembly 2 mounted therein are vibrated by a motor 5 interconnected with vibrating apparatus 8. In one illustrative embodiment, the vibrating apparatus 8 may be of the type which comprises an unbalanced clump weight on the end of or along a shaft. Two such shafts are arranged in tubes 8a and 8b. Optional elevator apparatus 7 provides for raising and lowering of the discharge end 12 of the basket 3. Typically the basket 3 will be in a "climb the hill" position so that, in use, a pool of liquid is maintained at the feed end 11 of the basket 3 and a beach at the discharge end 12.

Figure 1A:
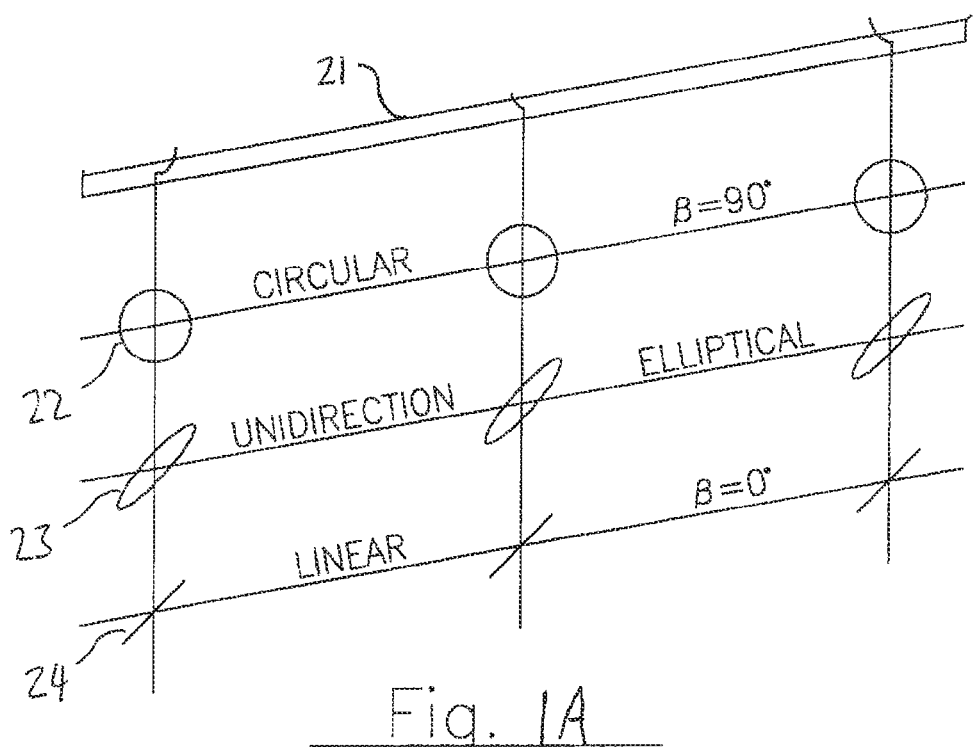
FIG. 1A shows a schematic diagram of a screen assembly and plots of displacement showing circular, elliptical and linear motion profiles.

In one illustrative embodiment, a control system 20 comprises an accelerometer 14 mounted on a plate 15 welded to a side of the basket 3. Preferably, the accelerometer 14 is located at or close to the center of mass of the basket 3, although it may be located anywhere on or in the basket 3 or screen assembly 2. The accelerometer 14 may be of the type which measures acceleration in a plane and that the accelerometer 14 is arranged such that the plane is parallel to side 16 of the basket 3. The accelerometer 14 may measure peak to peak acceleration and displacement. Thus, the accelerometer 14 may give meaningful values whether the shale shaker 1 is running in circular, linear or elliptical motion and no matter what the angle the longest chord of the elliptical motion is arranged at. FIG. 1A shows a screen assembly 21 and three typical motion profiles therefor: a circular motion profile 22; an elliptical motion profile 23; and a linear motion profile 24. The accelerometer 14 outputs an accelerometer signal.

In one illustrative embodiment, the control system 20 also comprises a computer 25 and an inverter 26 which are both located in a Zone 1 Xproof enclosure 28 or outside of a shaker room in which the shale shaker 1 may be located. The computer 25 analyzes the accelerometer signal and provides a computer signal to the inverter 26, based on a set of rules. A constant frequency power supply 27 is provided to the inverter 26. Based on the computer signal, the inverter 26 adjusts the frequency of an electrical output therefrom. The electrical output is connected to the AC motor 5 which drives the vibratory apparatus 8 of the shale shaker 1.

Figure 2:
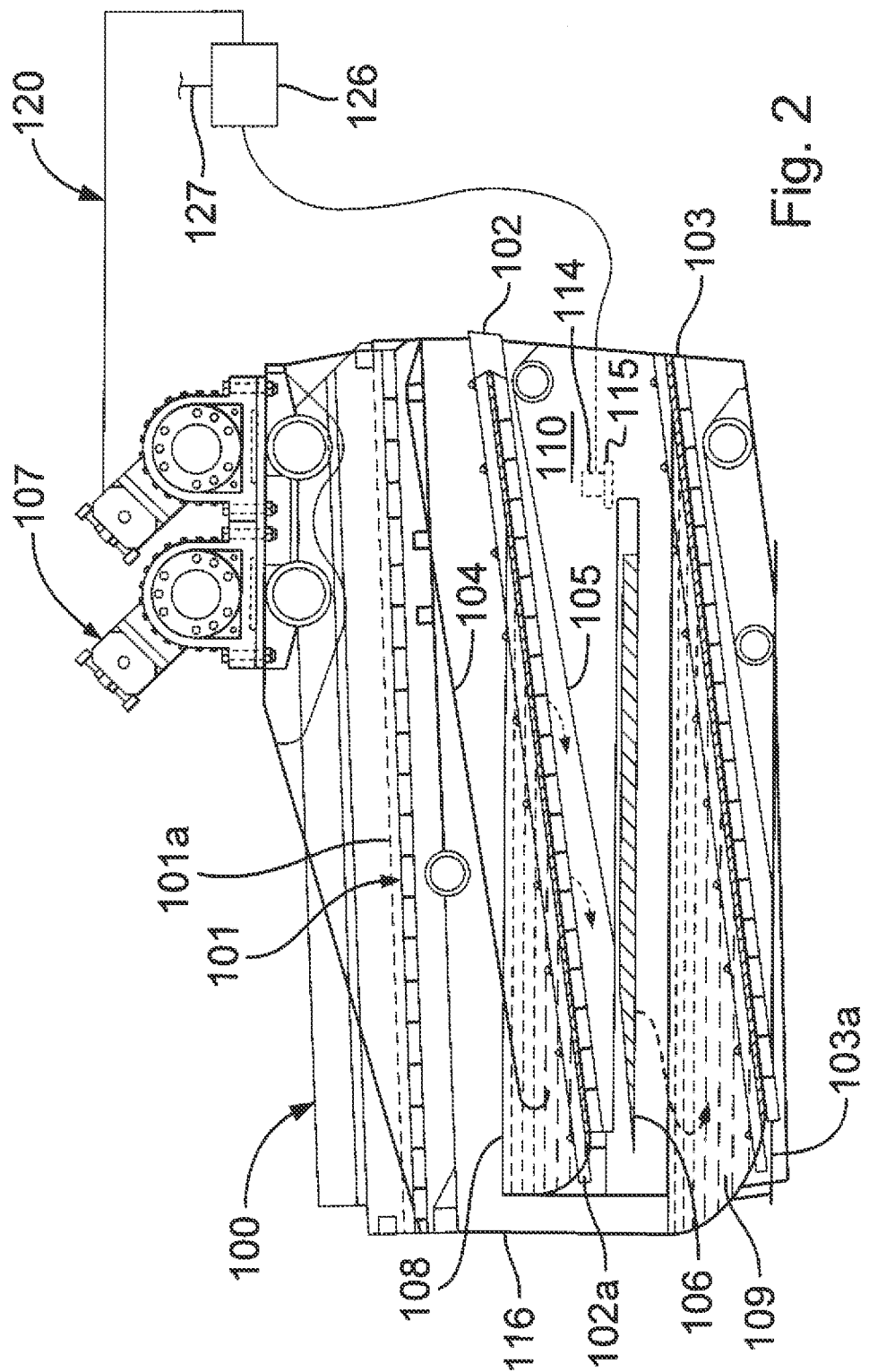
FIG. 2 is a side view in section of a basket of a shale shaker in accordance with the present disclosure with a control system in accordance with the present disclosure shown diagrammatically.

Referring to FIG. 2, there is shown an illustrative basket 100 for a shale shaker. The basket 100 is to be placed on a set of springs to isolate the basket 100 from a structural base (not shown). The basket 100 comprises a scalping deck 101 on which coarse screens 101a are mountable, an inclined primary deck 102 on which fine screens 102a are mountable and an inclined secondary deck 103 on which fine or finer screens 103a are mountable. A flow tray 104 is arranged to flow scalped solids laden drilling mud from the scalping deck 101 to a feed end of the primary deck 102. A further flow tray 105 is arranged to flow screened solids laden drilling fluid either to a collection receptacle or to a feed end of secondary screen deck 103 for further screening, dependent on the position of a slider plate 106. A distribution apparatus 116 may alternatively be used to split the flow of scalped solids laden drilling mud and distribute the flow on to both the primary deck 102 and secondary deck 103. Vibratory apparatus 107 is mounted on top of the basket 100. The vibratory apparatus 107 comprises a pair of motors, each having a rotor with offset clump weights attached thereto. Rotation of the offset clump weights induces an elliptical vibratory motion in the basket 100.

In use, a pool of solids laden drilling mud 108 forms on fine screens 102a in the inclined primary deck 102 and a pool of solids laden drilling mud 109 forms on fine or finer screens 103a in the inclined secondary deck 103.

In one illustrative embodiment, a control system 120 comprises an accelerometer 114 mounted on a plate 115 welded to an outer surface of a side 110 of the basket 3. In one case, the accelerometer 114 may be located at, on or close to the center of mass of the basket 100, although it may be located anywhere on or in the basket 100 or screen assembly therein. The accelerometer 114 is preferably of the type which measures acceleration in a plane and the accelerometer is arranged such that the plane is parallel to the side 110 of the basket 100. The accelerometer 114 measures peak to peak acceleration. Thus, the accelerometer 114 will give a meaningful accelerometer output value whether the shaker is running in circular, linear or elliptical motion and no matter what the angle the longest chord of the elliptical motion is arranged at.

In one illustrative embodiment, the control system 120 also comprises a programmable inverter 126 which may be located in a Zone 1 explosion proof enclosure or outside of a shaker room in which the shale shaker may be located. The accelerometer output value is an output voltage in the range 4-20 mV, indicative of the peak to peak acceleration. The output from the accelerometer 114 connects to an input of the programmable inverter 126. The programmable inverter 126 is programmed with a set of rules based on the voltage received from the accelerometer 114. A constant frequency power supply 127 is provided to the programmable inverter 126. Based on the set of rules, the programmable inverter 126 adjusts the frequency of an electrical output. The electrical output is connected to the AC motor of the vibratory mechanism 107 of the basket 100.

Figure 3:
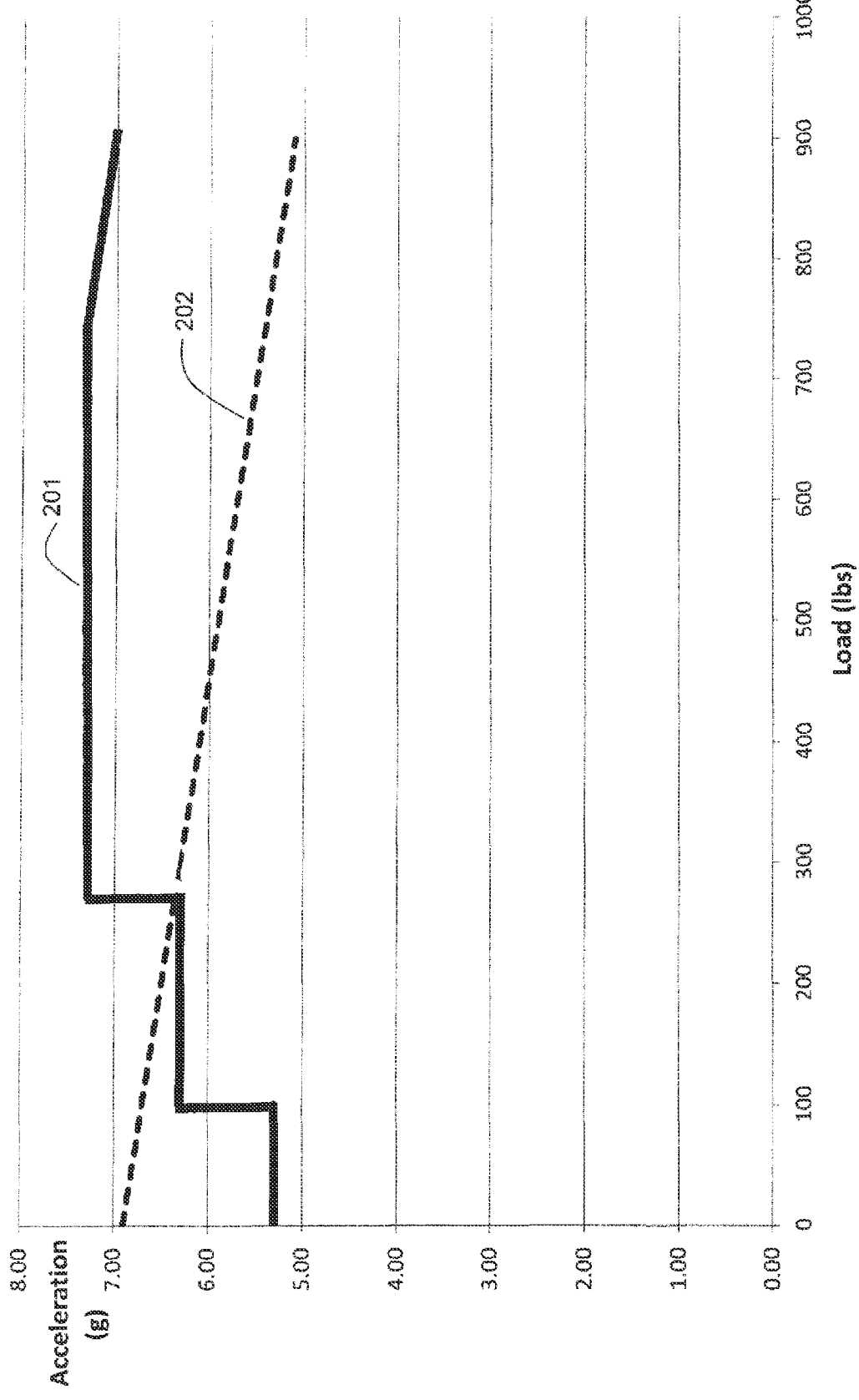
FIG. 3 is a graph showing acceleration of the basket shown in FIG. 2 against weight of solids laden drilling mud in the basket using the control system shown in black line and without the control system of the disclosure shown in dashed line.

FIG. 3 is a graph 200 showing acceleration of the basket shown in FIG. 2 against weight of solids laden drilling mud in the basket when: using the control system shown in black line 201; and without the control system of the invention shown in dashed line 202.

As can be seen from dashed line 202, acceleration on the basket 100 is around 70 m/s² (7.1 g) when the basket 100 has no load therein. This large acceleration induces wear on bearings and an increased risk of failure of parts of the shale shaker due to fatigue. When the basket 100 is processing fairly dry solids, there will be a relatively small mass in the basket, for example under 50 Kg (105 lbs). This particularly, but not exclusively, happens when the flow of solids laden drilling mud ceases and drilling fluid around the solids rapidly flows through the screens. As can be seen from dashed line 202, the acceleration on the basket remains high at around 68 m/s² (7.0 g). Processing solids such as rock at high acceleration can cause rapid degradation and failure of screening material on the screen assemblies in the basket 100. When, for example, there is a relatively high volume of drilling mud and rock or soft stone solids flowing into the basket 100, there may be around 115 Kg (255 lbs) of solids laden drilling mud in the basket 100, the basket being subjected to an acceleration of around 64 m/s² (6.5 g), which is generally regarded as a good acceleration value for this type of flow. When, for example, there is a relatively high volume of drilling mud and sticky clay solids, the basket 100 is relatively full of solids laden drilling mud, such as 270 Kg (600 lbs), the acceleration on the basket 100 falls to around 55 m/s² (5.7 g).

It should be noted that that the speed of rotation of the rotor in the vibratory mechanism 107 turning the off-set clump weight stays fairly constant no matter what the loading.

As can be seen from line 201, utilizing the control system of the present disclosure, acceleration on the basket 100 is around 52 m/s² (5.3 g) when the basket 100 has no load therein. This low acceleration reduces wear on bearings and reduces the risk of failure due to fatigue of parts of the shale shaker. When the basket 100 is processing fairly dry solids, there will be a relatively small mass in the basket, for example under 35 Kg (80 lbs). This particularly, but not exclusively, happens when the flow of solids laden drilling mud ceases or the formation being drilled through changes. As can be seen from line 201, the acceleration on the basket remains at 52 m/s² (5.3 g). When, for example, there is a relatively high volume of drilling mud and rock or soft stone solids flowing into the basket 100, there may be around 115 Kg (255 lbs) of solids laden drilling mud in the basket 100, the basket is subjected to an acceleration of around 62 m/s2 (6.3 g), which is generally regarded from experience in the field as a good acceleration value for this type of flow and mass in the basket. When the basket 100 is relatively full of solids laden drilling mud, such as 270 Kg (600 lbs), the acceleration on the basket 100 increases to around 72 m/s² (7.3 g). It should be noted that that the speed of rotation of the rotor turning the off-set clump weight in the vibratory mechanism 107 varies according to load to meet the acceleration values shown in the graph.

The inventors have found from experience in the field that, for the basket shown in FIG. 2, a peak to peak acceleration value for the shaker in: a no and low load condition (e.g., below 50 Kg) may be approximately 54 m/s² (5.5 g); in a moderate load condition (e.g., between 50 Kg and 135 Kg) may be approximately 62 m/s² (6.3 g); and in a high load condition (e.g., above 135 Kg) may be approximately 70 m/s² (7.1 g).

Figure 4:
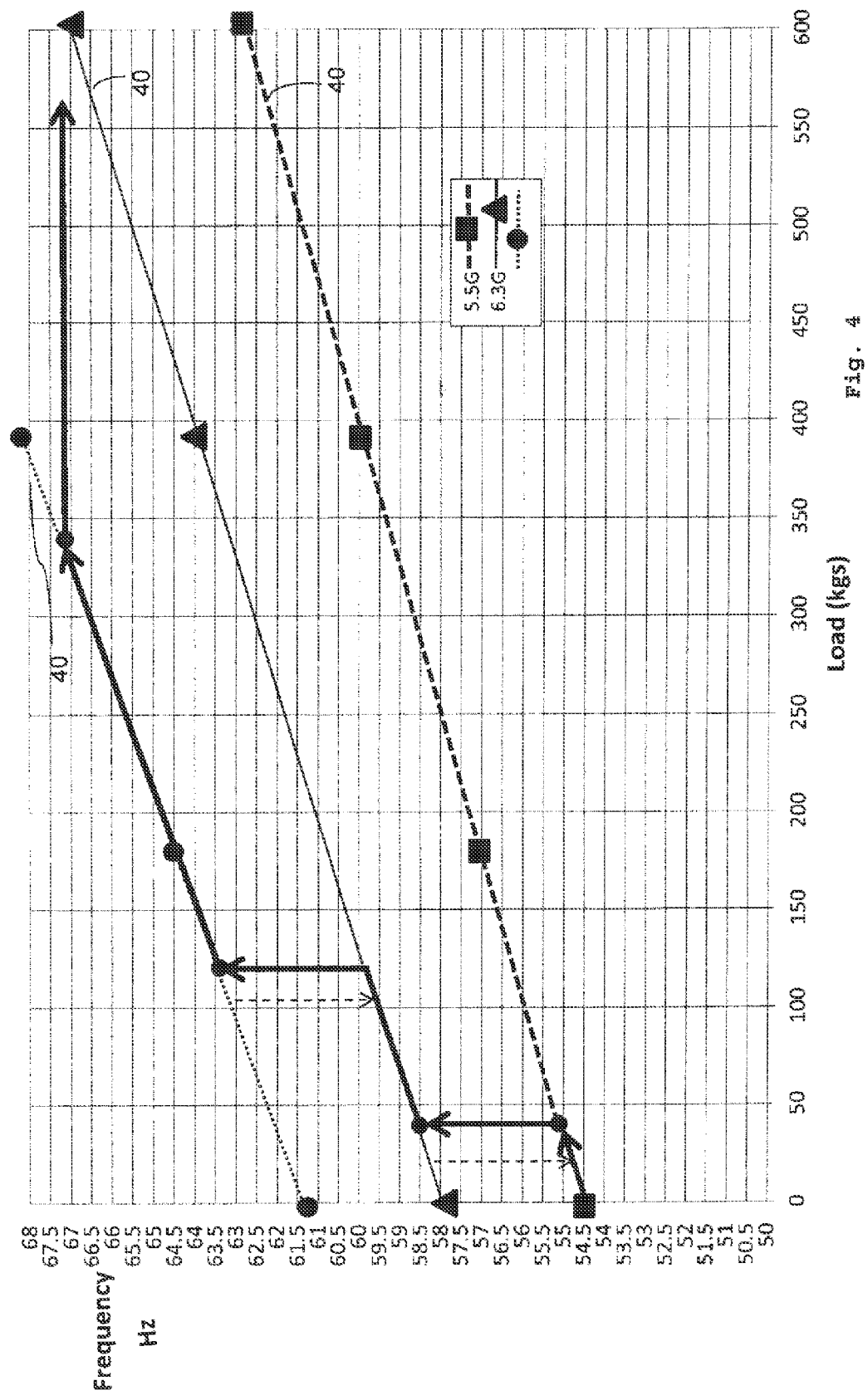
FIG. 4 is a graph showing frequency of the output from the inverter shown in FIG. 2 against mass of solids laden drilling mud in the basket.

FIG. 4 shows a graph of frequency of the output from the programmable inverter 126 shown in FIG. 2 against mass of solids laden drilling mud in the basket 100. The frequency of the output is directly proportional to the running speed of the motor of the vibratory mechanism 107. As can be seen, the programmable inverter 126 is programmed to ramp-up the frequency as mass of solids laden drilling mud in the basket 100 from 55 Hz to 56 Hz to maintain a constant acceleration, e.g., 54 m/s² (5.5 g) up to 50 Kg (105 lbs). The programmable inverter 126 is programmed to step up the acceleration at a first set point of approximately 50 Kg to 62 m/s² (6.3 g) from approximately 56 Hz to 59 Hz. Between approximately 50 Kg (105 lbs) and approximately 135 Kg (300 lbs), the programmable inverter 126 may be programmed to ramp-up the frequency as mass of solids laden drilling mud in the basket 100 increases to maintain a constant acceleration of approximately 62 m/s² (6.3 g) from approximately 59 Hz to approximately 60 Hz. The programmable inverter 126 may be programmed to step up the acceleration at a second set point of approximately 135 Kg to approximately 70 m/s² (7.1 g) to approximately 63.5 Hz. Between approximately 135 Kg and approximately 350 Kg, the programmable inverter 126 may be programmed to ramp-up the frequency as mass of solids laden drilling mud in the basket 100 increases to maintain an approximately constant acceleration of approximately 70 m/s² (7.1 g) from approximately 63.5 Hz to approximately 67 Hz. Above 350 Kg, the programmable inverter 126 may be programmed to maintain the frequency output at approximately 67 Hz, and thus acceleration will tail off, as shown in FIG. 3, from above 7 g to below 7 g. The motor may slip by up to 2% but rarely slips by more than 1%. This slippage may be accounted for in the programming of the programmable inverter 126. The maximum frequency of approximately 67 Hz is set to inhibit damage to the vibratory mechanism and parts of the shaker and to keep within recommended use parameters.

As loading of solids laden drilling mud in the basket 100 reduces, the programmable inverter 126 may be programmed to ramp-down the frequency as mass of solids laden drilling mud in the basket 100 to maintain a constant acceleration of preferably approximately 70 m/s$^2$ (7.1 g) by reducing the frequency from approximately 67 Hz to approximately 63 Hz. At a third set point equal to a loading of approximately 125 Kg, the programmable inverter 126 may be programmed to step down the acceleration to approximately 62 m/s$^2$ (6.3 g) to approximately 62 Hz. The third set point may be set at a different load to the second set point to inhibit chatter where a loading around 135 Kg could cause the basket to flip between the two acceleration values if the second and third set points are equal. In one illustrative embodiment, between approximately 125 Kg and approximately 40 Kg (105 lbs) the programmable inverter 126 may be programmed to ramp-down the frequency as mass of solids laden drilling mud in the basket 100 reduces to maintain an approximately constant acceleration of approximately 62 m/s$^2$ (6.3 g) from approximately 60 Hz to approximately 58.5 Hz. At a fourth set point equal to a loading of 40 Kg, the programmable inverter 126 may be programmed to step down the acceleration to approximately 54 m/s$^2$ (5.5 g) by reducing the frequency to approximately 55.5 Hz. The fourth set point is set at a different load to the first set point to inhibit chatter where a loading around 50 Kg could cause the basket to flip between the two acceleration values if the second and third set points are equal.

FIG. 5 shows an illustrative shale shaker 150 in accordance with the present disclosure, the shale shaker 150 comprising a basket 160 mounted on a skid 165. The basket 150 is vibrated by vibration apparatus 157. From a weir tank 151, solids laden fluid (for example, drilling fluid with drilled cuttings and debris therein) flows onto a first screen 153 which is supported by a screen support connected to the basket 160. Part of the fluid then flows onto primary screens 154, 155, 156 on a primary deck 152. Part of the fluid flows into a receptacle 159 and oversized solids off an exit end 166 of the screen 156.

The solids laden fluid forms a pool (not shown) above the screens 154-156. Depending on the fluid, on the fluid viscosity, on the fluid's solids content, on the rate of fluid flow, and the through-put of the screens, a beach is created at the exit end 166 of the screen 156.

In one illustrative embodiment, an ultrasonic transducer sensor measurement apparatus 167 is connected to the basket 160 and is, optionally, positioned above the pool (not shown). Such locations for the apparatus 167 provide measurement at locations providing the greatest range of pool depth. The apparatus 167 is in communication with a control apparatus 168. The sensor apparatus 167 generates a signal indicative of sensor-to-pool distance which indicates depth of the pool beneath the sensor apparatus to assess the size of the pool. The control apparatus 168 calculates a volume of solids laden fluid in the basket 160 from the measurement received from the ultrasonic transducer sensor measurement apparatus 167 and the known angle of the screens 154-156. The control apparatus 168 can estimate a mass of solids laden fluid in the basket using an estimated or predetermined density for solids laden drilling fluid. A signal indicative of the mass in the basket 160 is then sent to a programmable inverter 168 which is provided with the same rules as described above with reference to FIGS. 2, 3 and 4.

In one aspect, a vibratory separator or shale shaker may employ a material flow sensor 180 which produces a signal indicative of the presence or absence of material flowing onto screen apparatus, e.g., but not limited to, drilling fluid with drilled solids flowing onto screen apparatus of a shale shaker. If the signal therefrom indicates a sudden rush of fluid into the basket 160, a signal from the flow sensor 180 is sent to the control apparatus 168 which processes the signal and sends a signal to an elevator apparatus, such as elevator apparatus 7 shown in FIG. 1, to increase the angle of the basket 160 and hence screens 154-156 to inhibit the likelihood of drilling fluid gushing over discharge end 166 of the shale shaker 150.

It will be appreciated by those skilled in the art that the systems and processes disclosed herein may be fully automated/autonomous via software configured with algorithms to perform the processes as described herein. These aspects may be implemented by programming one or more suitable general-purpose computers having appropriate hard-ware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a magnetic tape; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for operating a shale shaker to separate solids from a solids laden drilling fluid, the method comprising:
introducing a flow of solids laden drilling fluid to a basket of said shale shaker;
controlling operation of a vibratory mechanism of said shale shaker so as to control an acceleration induced in said basket along a stepped non-linear basket acceleration operating curve based on a magnitude of a load of said solids laden drilling fluid in said basket, wherein controlling said basket acceleration along said stepped non-linear basket acceleration operating curve comprises varying said basket acceleration at least between a substantially constant first acceleration and a substantially constant second acceleration that is greater than said substantially constant first acceleration, said basket acceleration being maintained at said substantially constant first acceleration over a first operating load range wherein said magnitude of said load of solids laden drilling fluid in said basket is between a substantially zero load and a first load threshold.

2. The method of claim 1, wherein controlling said operation of said vibratory mechanism comprises using a control apparatus that is operatively coupled to said shale shaker to adjust a vibrational frequency of said vibratory mechanism.

3. The method of claim 2, wherein adjusting said vibrational frequency of said vibratory mechanism comprises adjusting a speed of an AC drive motor of said vibratory mechanism with a variable frequency drive that is operatively coupled to said AC drive motor.

4. The method of claim 2, wherein controlling said operation of said vibratory mechanism comprises measuring said basket acceleration with an accelerometer that is operatively coupled to said basket, transmitting an acceleration signal representing said measured basket acceleration to said control apparatus, and using said control apparatus to adjust said vibrational frequency of said vibratory mechanism based at least on said transmitted acceleration signal.

5. The method of claim 2, wherein controlling said operation of said vibratory mechanism further comprises monitoring said magnitude of said load of solids laden drilling fluid in said basket, transmitting a load signal representing said monitored load magnitude to said control apparatus, and using said control apparatus to adjust said vibrational frequency of said vibratory mechanism based at least on said transmitted load signal.

6. The method of claim 5, wherein monitoring said magnitude of said load of solids laden drilling fluid in said basket comprises using a distance measuring apparatus that is operatively coupled to said shale shaker to determine a depth of a pool of said solids laden drilling fluid in said basket and determining said load magnitude based on said depth of said pool.

7. The method of claim 1, wherein said substantially constant first acceleration is less than a first pre-determined basket acceleration and a second pre-determined basket acceleration, said first and second pre-determined basket accelerations corresponding to a basket acceleration at said zero load and a basket acceleration at said first load threshold, respectively, on a substantially linear basket acceleration operating curve of said shale shaker that is based on operating said vibratory mechanism at a substantially constant vibrational frequency.

8. The method of claim 7, wherein said substantially constant second acceleration is less than said second pre-determined basket acceleration.

9. The method of claim 1, wherein varying said basket acceleration along said stepped acceleration operating curve further comprises inducing a first step-change in said basket acceleration so as to step up said basket acceleration from said substantially constant first acceleration to said substantially constant second acceleration when said magnitude of said load of solids laden drilling fluid in said basket exceeds said first load threshold.

10. The method of claim 9, wherein varying said basket acceleration along said stepped acceleration operating curve further comprises inducing a second step-change in said basket acceleration so as to step down said basket acceleration from said substantially constant second acceleration to said substantially constant first acceleration when said magnitude of said load of solids laden drilling fluid in said basket drops below said first load threshold.

11. The method of claim 10, wherein said first load threshold is between approximately 40 Kg and approximately 150 Kg.

12. The method of claim 10, wherein inducing at least one of said first and second step-changes in said basket acceleration comprises changing said basket acceleration by at least approximately 5 m/s$^2$ (0.5 g).

13. The method of claim 1, wherein varying said basket acceleration along said stepped acceleration operating curve further comprises maintaining said basket acceleration at said substantially constant second acceleration over a second operating load range wherein said magnitude of said load of solids laden drilling fluid in said basket is between said first load threshold and a second load threshold.

14. The method of claim 13, wherein said substantially constant second acceleration is less than a pre-determined basket acceleration that corresponds to a basket acceleration at said second load threshold on a substantially linear basket acceleration operating curve of said shale shaker that is based on operating said vibratory mechanism at a substantially constant vibrational frequency.

15. The method of claim 13, wherein said substantially constant second acceleration is greater than a pre-determined basket acceleration that corresponds to a basket acceleration at said second load threshold on a substantially linear basket acceleration operating curve of said shale shaker that is based on operating said vibratory mechanism at a substantially constant vibrational frequency.

16. The method of claim 13, wherein varying said basket acceleration along said stepped acceleration operating curve further comprises inducing a third step-change in said basket acceleration so as to step up said basket acceleration from said substantially constant second acceleration to a substantially constant third acceleration when said magnitude of said load of solids laden drilling fluid in said basket exceeds said second load threshold.

17. The method of claim 16, wherein said second load threshold is between approximately 40 Kg and approximately 150 Kg.

18. The method of claim 16, wherein inducing at least one of said first and third step-changes in said basket acceleration comprises changing said basket acceleration by at least approximately 5 m/s$^2$ (0.5 g).

19. The method of claim 16, wherein varying said basket acceleration along said stepped acceleration operating curve further comprises maintaining said basket acceleration at said substantially constant third acceleration over a third operating load range wherein said magnitude of said load of solids laden drilling fluid in said basket is between said second load threshold and at least a third load threshold.

20. The method of claim 19, wherein said third load threshold is between approximately 150 Kg and 300 Kg.

21. The method of claim 19, wherein said substantially constant third acceleration is greater than a pre-determined basket acceleration that corresponds to a basket acceleration at said second load threshold on a substantially linear basket acceleration operating curve of said shale shaker that is based on operating said vibratory mechanism at a substantially constant vibrational frequency.

22. The method of claim 16, wherein varying said basket acceleration along said stepped acceleration operating curve further comprises inducing a fourth step-change in said basket acceleration so as to step down said basket acceleration from said substantially constant third acceleration to said substantially constant second acceleration when said magnitude of said load of solids laden drilling fluid in said basket drops below said second load threshold.

23. A method for operating a shale shaker to separate solids from a solids laden drilling fluid, the method comprising:

introducing a flow of solids laden drilling fluid to a basket of said shale shaker;

controlling operation of a vibratory mechanism of said shale shaker with a control apparatus by varying a speed of a drive motor of said vibratory mechanism so as to vary an acceleration induced in said basket along a stepped non-linear basket acceleration operating curve based on a magnitude of a load of said solids laden drilling fluid in said basket, wherein varying said basket acceleration along said stepped non-linear basket acceleration operating curve comprises:

maintaining said basket acceleration at a substantially constant first acceleration over a first operating load range wherein said magnitude of said load of solids laden drilling fluid in said basket is between a substantially zero load and a first load threshold, said substantially constant first acceleration being less than first and second pre-determined basket accelerations corresponding to a basket acceleration at said zero load and a basket acceleration at said first load threshold, respectively, on a substantially linear basket acceleration operating curve of said shale shaker that is based on operating said vibratory mechanism at a substantially constant vibrational frequency;

inducing a first step-change in said basket acceleration so as to step up said basket acceleration from said substantially constant first acceleration to a substantially constant second acceleration that is greater than said substantially constant first acceleration when said magnitude of said load of solids laden drilling fluid in said basket exceeds said first load threshold;

maintaining said basket acceleration at said substantially constant second acceleration over a second operating load range wherein said magnitude of said load of solids laden drilling fluid in said basket is between said first load threshold and a second load threshold, said substantially constant second acceleration being less than at least one of said second pre-determined basket acceleration and a third pre-determined basket acceleration corresponding to a basket acceleration at said second load threshold on said substantially linear basket acceleration operating curve; and inducing a second step-change in said basket acceleration so as to step down said basket acceleration from said substantially constant second acceleration to said substantially constant first acceleration when said magnitude of said load of solids laden drilling fluid in said basket drops below said first load threshold.

24. A control system that is adapted to control operation of a shale shaker, said control system comprising:

a control apparatus that is adapted to control an acceleration that is induced in a basket of said shale shaker along a non-linear basket acceleration operating curve based on a magnitude of a load of solids laden drilling fluid in said basket, wherein said non-linear basket acceleration operating curve defines at least a substantially constant first acceleration over a first operating load range, a substantially constant second acceleration over a second operating load range, and a variation between said substantially constant first and second accelerations; and an inverter that is operatively coupled to said control apparatus and to a drive motor of a vibratory mechanism of said shale shaker, wherein said inverter is adapted to receive a control signal from said control apparatus and to adjust a motor speed of said drive motor based on said control signal so as to control said basket acceleration, said control apparatus being adapted to control said motor speed of said drive motor with said inverter so as to maintain said basket acceleration at said substantially constant first acceleration over said first operating load range, to induce a first step-change in said basket acceleration so as to step up said basket acceleration from said substantially constant first acceleration to said substantially constant second acceleration when said magnitude of said load of solids laden drilling fluid in said basket exceeds a first load threshold, to maintain said basket acceleration at said substantially constant second acceleration over said second operating load range, and to induce a second step-change in said basket acceleration so as to step down said basket acceleration from said substantially constant second acceleration to said substantially constant first acceleration when said magnitude of said load of solids laden drilling fluid in said basket drops below said first load threshold, wherein at least one of said substantially constant first and second accelerations is less than a pre-determined basket acceleration corresponding to a basket acceleration at said first load threshold on a substantially linear basket acceleration operating curve of said shale shaker that is based on controlling said drive motor at a substantially constant motor speed.

25. The control system of claim 24, further comprising at least one accelerometer that is operatively coupled to said control apparatus and to said basket, wherein said at least one accelerometer is adapted to measure said basket acceleration and to transmit an acceleration signal representing said basket acceleration to said control apparatus.

26. The control system of claim 24, further comprising a distance measuring apparatus that is operatively coupled to said control apparatus and to said shale shaker, wherein said distance measuring apparatus is adapted to monitor a depth of a pool of said solids laden drilling fluid in said basket and to transmit a depth signal representing said monitored depth of said pool to said control apparatus, said control apparatus being adapted to determine said magnitude of said load of solids laden drilling fluid in said basked based on said depth signal.

27. The control system of claim 24, wherein said non-linear basket acceleration operating curve further defines at least a substantially constant third acceleration over a third operating load range and a variation between said substantially constant second and third accelerations, said control system being further adapted to induce a third step-change in said basket acceleration so as to step up said basket acceleration from said substantially constant second acceleration to said substantially constant third acceleration when said magnitude of said load of solids laden drilling fluid in said basket exceeds a second load threshold and to maintain said basket acceleration at said substantially constant third acceleration over said third operating load range.

* * * * *

UNITED STATES PATENT AND TRADEMARK OFFICE
CERTIFICATE OF CORRECTION

PATENT NO. : 9,199,278 B2  
APPLICATION NO. : 13/039933  
DATED : December 1, 2015  
INVENTOR(S) : Eric Scott et al.

Page 1 of 1

It is certified that error appears in the above-identified patent and that said Letters Patent is hereby corrected as shown below:

On the title page, please amend the Assignee item (73) to read as follows:

Assignee: National Oilwell Varco, L.P., Houston, TX (US)

Signed and Sealed this
Twenty-eighth Day of June, 2016

Michelle K. Lee
*Director of the United States Patent and Trademark Office*